(12) United States Patent
Schmieder (10) Patent No.: US 10,156,432 B1
(45) Date of Patent: Dec. 18, 2018

(54) INTERFEROMETER

(71) Applicant: Adam Alexander Schmieder, Pittsburgh, PA (US)

(72) Inventor: Adam Alexander Schmieder, Pittsburgh, PA (US)

(*) Notice: Subject to any disclaimer, the term of this patent is extended or adjusted under 35 U.S.C. 154(b) by 0 days.

(21) Appl. No.: 15/651,160

(22) Filed: Jul. 17, 2017

Related U.S. Application Data (60) Provisional application No. 62/363,959, filed on Jul. 19, 2016.

(51) Int. Cl.
*G01B 9/02* (2006.01)
*G01J 3/453* (2006.01)
*G02B 26/08* (2006.01)
*G02B 6/12* (2006.01)

(52) U.S. Cl.
CPC ........ *G01B 9/02017* (2013.01); *G01J 3/4537* (2013.01); *G02B 26/0816* (2013.01); *G02B 26/0875* (2013.01); *G02B 2006/12159* (2013.01)

(58) Field of Classification Search
None
See application file for complete search history.

(56) References Cited

U.S. PATENT DOCUMENTS

| | | | |
|---|---|---|---|
| 3,443,871 A * | 5/1969 | Chitayat | G01B 9/02051 356/498 |
| 3,776,636 A | 12/1973 | Dandliker et al. | |
| 4,037,967 A | 7/1977 | Schweizer et al. | |
| 4,188,122 A | 2/1980 | Massie et al. | |
| 4,406,542 A | 9/1983 | Boggy et al. | |
| 4,948,253 A | 8/1990 | Biegen | |
| 5,029,992 A | 7/1991 | Richardson | |
| 6,061,133 A | 5/2000 | Freischlad | |
| 6,166,645 A * | 12/2000 | Blaney | G08B 19/02 250/339.11 |
| 6,616,868 B1 | 9/2003 | Gotah et al. | |
| 7,286,208 B2 | 10/2007 | Smith et al. | |
| 8,330,963 B2 * | 12/2012 | Pryadkin | G01B 11/03 356/482 |
| 8,654,346 B2 | 2/2014 | Wegmann | |
| 8,981,297 B2 | 3/2015 | Boeckem et al. | |
| 2002/0176092 A1 | 11/2002 | Deck | |
| 2003/0030819 A1 | 2/2003 | Kuechel | |
| 2003/0058530 A1* | 3/2003 | Kawano | G02B 21/002 359/385 |
| 2004/0075841 A1* | 4/2004 | Van Neste | G01B 9/02012 356/497 |
| 2005/0237541 A1 | 10/2005 | Smith et al. | |
| 2005/0254058 A1* | 11/2005 | Alphonse | A61B 5/0066 356/479 |

\* cited by examiner

*Primary Examiner* — Charlie Y Peng
(74) *Attorney, Agent, or Firm* — Thomas M. Joseph, Esq (57) ABSTRACT

An incoming laser source beam is projected to a glass disc having a frosted upper surface. A refracted beam and a reflected beam are produced from the laser source beam. The refracted beam is reflected back to and through the glass disc to combine with the reflected beam to form an interference pattern on the target.

7 Claims, 10 Drawing Sheets

INTERFEROMETER

CROSS REFERENCE TO RELATED APPLICATION

This application claims the benefit under 35 U.S.C. § 119(e) of U.S. Provisional Application No. 62/363,959 entitled "INTERFEROMETER" filed Jul. 19, 2016, which is incorporated herein by reference.

BACKGROUND

Conventional interferometers can be used for a variety of purposes in the fields of astronomy, fiber optics, engineering metrology, optical metrology, oceanography, seismology, spectroscopy, quantum mechanics, nuclear and particle physics, plasma physics, remote sensing, biomolecular interactions, surface profiling, microfluidics, mechanical stress/strain measurement, velocimetry, and optometry. In operation, interferometers utilize two beams that have propagated along different paths to produce an interference pattern that is attributable to optical path differences.

Interferometers can be characterized as double-path interferometers or common path interferometers. In double-path interferometers, a reference beam and a sample beam travel along divergent paths. Examples of double-path interferometers include the Michelson interferometer, the Twyman-Green interferometer, and the Mach-Zehnder interferometer.

In common-path interferometers, the reference beam and sample beam travel along the same path. Examples of common-path interferometers include the Sagnac interferometer, the fibre optic gyroscope, the point diffraction interferometer, the shearing interferometer, the air wedge shearing interferometer, the Zernike phase contrast microscope, Fresnel's biprism, the zero-area Sagnac, and the scatterplate interferometer.

Interferometers can be characterized as wavefront splitting interferometers or amplitude splitting interferometers. Wavefront splitting interferometers divide a light wavefront emerging from a point or a narrow slit. The two parts of the wavefront to travel through different paths and are recombined. Examples of wavefront splitting interferometers include Young's interference experiment, Lloyd's mirror, the Fresnel biprism, the Billet Bi-Lens, and the Rayleigh interferometer.

Amplitude splitting interferometers use a partial reflector to divide the amplitude of the incident wave into separate beams which are separated and recombined. Examples of amplitude splitting interferometers include the Michelson interferometer, the Twyman-Green interferometer, the Mach-Zehnder interferometer, the Fizeau interferometer, the Fabry-Pérot interferometer, the laser unequal path interferometer, and the Linnik interferometer.

Other examples of interferometers include the Gires-Tournois interferometer, the Jasmin interferometer, the Lummer-Gehrcke interferometers, the Mirau interferometer, the Rayleigh interferometer, the n-slit interferometer, and the self-feedback/mixing/backscatter interferomer.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, an incoming laser source beam is projected to a glass disc having a frosted upper surface. A refracted beam and a reflected beam are produced from the laser source beam. The refracted beam is reflected back to and through the glass disc to combine with the reflected beam to form an interference pattern on the target.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more aspects of the described subject matter. It is to be appreciated, however, that such aspects can be practiced without these specific details.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Referring to the drawings and, particularly, to FIGS. 1A-1G, there is shown an interferometer, generally designated as 10, that can implement aspects of the described subject matter. The interferometer 10 includes a light source assembly 12, a glass disc assembly 14, and a receiver 16. The glass disc assembly 14 includes a glass disc 18 for receiving light from the light source assembly 12.

Figure 1A:
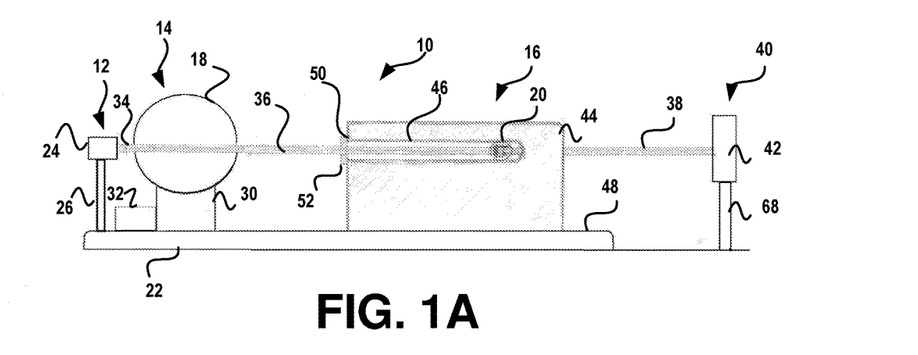
FIG. 1A illustrates a cross sectional view in side elevation of an embodiment that can implement aspects of the described subject matter.
Figure 1B:
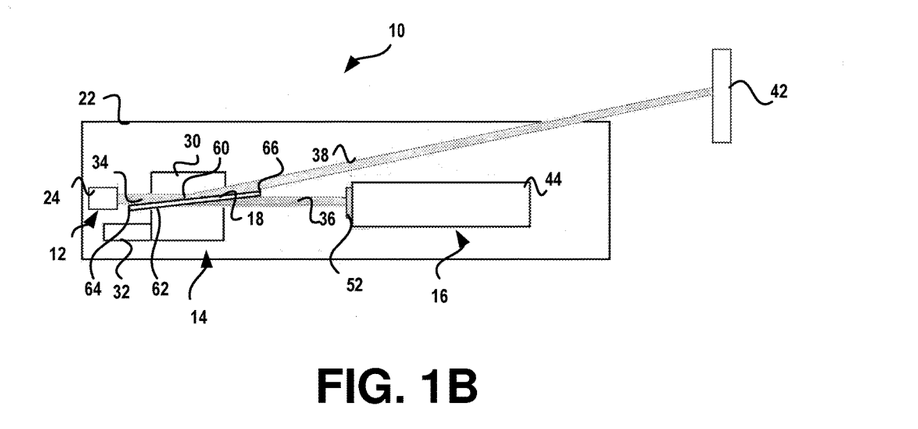
FIG. 1B illustrates a top plan view of the embodiment shown in FIG. 1 that can implement aspects of the described subject matter.
Figure 1C:
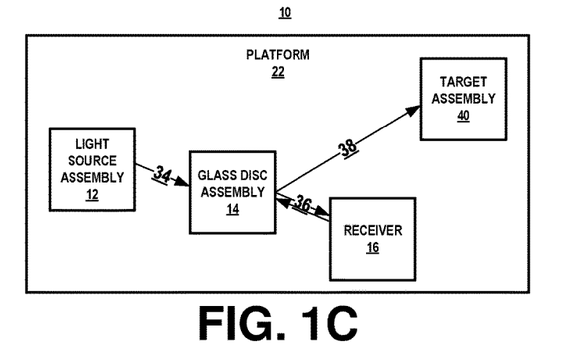
FIG. 1C illustrates a block diagram of the embodiment shown in FIG. 1 that can implement aspects of the described subject matter.
Figure 1D:
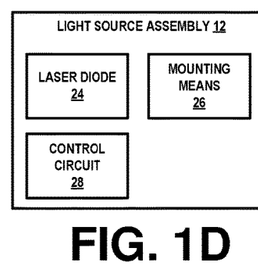
FIG. 1D illustrates a block diagram of a light source assembly that can implement aspects of the described subject matter.
Figure 1E:
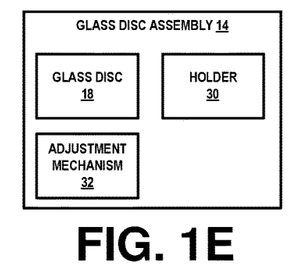
FIG. 1E illustrates a block diagram of a glass disc assembly that can implement aspects of the described subject matter.
Figure 1F:
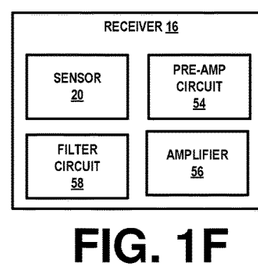
FIG. 1F illustrates a block diagram of a receiver that can implement aspects of the described subject matter.

The receiver 16 includes a sensor 20 for processing light refracted from the glass disc 18. The sensor 20 can magnify and buffer a Doppler signal. The sensor 20 also utilizes the wave properties of light to modulate light from the light source assembly 12. As a result, the sensor 20 creates a feedback.

The light source assembly 12, the glass disc assembly 14, and the receiver 16 are mounted on a platform 22 in a predetermined spatial relationship, so that the light source assembly 12 can project toward the glass disc assembly 14. The relative positions of the light source assembly 12, the glass disc assembly 14, and the receiver 16 can be fixed to the platform 22 to achieve a permanent configuration. Alternatively, one or more of the light source assembly 12, the glass disc assembly 14, and the receiver 16 can be mounted on the platform 22 in a manner that allows for adjustment of their relative positions.

The light source assembly 12 can be a laser assembly that includes a laser diode 24, mounting means 26, and control circuit 28. The laser diode 24 can be a 650 nm, 5 mW laser diode. The control circuit 28 can be a micro control circuit, such as a DDR circuit.

Mounting means 26 can be a tripod or other similar mounting device that allows for the adjustment of the height of the laser diode 24 relative to the platform 22. Alternatively, mounting means 26 can fix the height of the laser diode 24.

The glass disc assembly 14 includes the glass disc 18, a holder 30, and an adjustment mechanism 32. The glass disc 18 is an essentially flat, frosted glass disc with a 44 mm diameter and a thickness of 1.5 mm. The adjustment mechanism 32 is a mechanical adjuster that has the ability to adjust the height of the glass disc 18 relative to the platform 22. Additionally, the adjustment mechanism 32 has the ability to rotate the glass disc 18 relative to the laser diode 24.

Figure 1G:
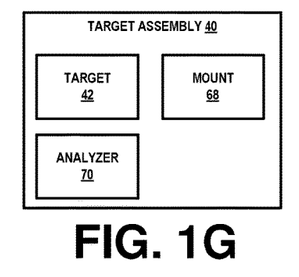
FIG. 1G illustrates a block diagram of a target assembly that can implement aspects of the described subject matter.

When the light source assembly 12 projects the source beam 34 onto the glass disc assembly 14, the source beam 34 will interact with the glass disc 18 to produce a refracted beam 36 and a reflected beam 38. The reflected beam 38 will reflect off of the glass disc 18 and strike a target assembly 40. The target assembly 40 can include a target 42.

The refracted beam 36 will travel through the glass disc 18 to the receiver 16. The receiver 16 will convey the refracted beam 36 to the sensor 20. The sensor 20 has the ability to reflect the refracted beam 36 back to the glass disc 18 to combine with the reflected beam 38 to produce an interference pattern on the target 42.

The glass disc assembly 14 must position the glass disc 18 in a predetermined position relative to the light source assembly 12 to produce the refracted beam 36 and the reflected beam 36. The holder 30 can hold the glass disc 18 in the predetermined position and the adjustment mechanism 32 can adjust the position of the glass disc 18 relative to the light source 14 to produce an interference pattern on the target 42.

The receiver 16 can include a case 44 for holding the sensor 20. The case 44 can include an essentially cylindrical bore 46 that is essentially parallel to an upper surface 48 of the platform 22. The sensor 18 is mounted within the bore 46 at one end. The bore 46 communicates with an opening 50 in the case 44 at the opposite end. An ultraviolet filter 52 covers the opening 50.

The sensor 20 includes a photocell for processing the refracted beam 36. The refracted beam 36 strikes the ultraviolet filter 52 and travels through the opening 50 into the bore 46. The sensor 20 receives the refracted beam 36, so that the photocell can send the refracted beam 36 back through the bore 46, the opening 50, and the ultraviolet filter 52. Preferably, the photocell is a LED and the refracted beam hits the LED with part of the beam offset from the center of the LED.

It should be understood that the light source 14 and the sensor 20 can use the same type of LED or different types of LEDs. Preferably, the light source 14 and the sensor 20 utilize LEDs that include red LED material. Alternatively, the light source 14 and the sensor can utilize white LED material.

The sensor 20 can connect to a pre-amp circuit 54, an amplifier 56, and, optionally, a filter circuit 58. The amplifier 56 can be any suitable amplifying device, such as an LM386 amplifying device with a printed circuit board. The amplifier 56 can send out an output analog signal to any analog processor, ADC or recording device. Optionally, the amplifier 56 can include a 10k potentiometer for speaker output assistance.

As shown in FIGS. 1A-1H, the source beam 34 passes through the glass disc 18 and, approximately, half of the beam intensity is reflected from an upper surface 60 to form the reflected beam 38. The remaining portion of the source beam 34 is internally reflected until a diffusing point alters the path. Preferably, the upper surface 60 is a frosted surface.

The angle between the source beam 34 and the upper surface 60 can be adjusted by utilizing the adjustment mechanism 32 to rotate the glass disc 18 within the glass disc assembly 14. The angle should be minimized to create strong signal coupling because the output intensity decreases as the angle increases. Preferably, the angle will be range from about 10 degrees to essentially 0 degrees. Most preferably, the angle will be from between about 3 degrees to about 4 degrees.

Once the internally reflected portion of source beam 34 exceeds a critical angle, the refracted beam 36 is formed. The refracted beam 36 emerges through a lower surface 62 of the glass disc 18. Preferably, the lower surface 62 is not a frosted surface.

The glass disc 18 can include unpolished edges 64, 66 and imperfections that allow a small portion of the light intensity to exit in all directions to form a diffuse glow. The diffuse glow projects outwardly from the unpolished edges 64, 66.

The selection of material for the glass disc 18 is not critical. Preferably, the glass disc 18 will be constructed from a material that has an index of refraction of between 1.4 and 1.6. Most preferably, the glass disc 18 will have an index of refraction of about 1.5.

The refracted beam 36 is reflected back from the photocell 20 through the glass disc 18 to combine with the reflected beam 36 to form an interference pattern on the target 42. The target 42 can be mounted on a mount 68. The interference pattern can be processed through an analyzer 70.

The analyzer 70 can be a spectrometer that characterizes the spectrum of the combined refracted beam 36 and reflected beam 38 to determine how much light is emitted at each different wavelength. The analyzer 70 can determine the intensity and other characteristics of the signal.

Figure 1H:
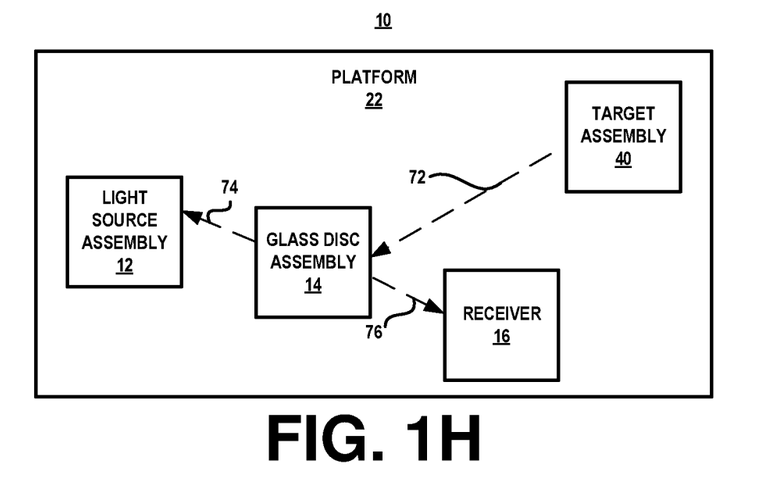
FIG. 1H illustrates a block diagram of the embodiment shown in FIG. 1 that can implement aspects of the described subject matter.

As shown in FIG. 1H, a portion 72 of the reflected beam 38 shown in FIG. 1C can be reflected from the target assembly 40 to the glass disc assembly 14. A fraction 74 of the portion 72 will reflect back to the light source assembly 14. This can result in a feedback effect with the laser diode 24 shown in FIG. 1D.

Another fraction 76 will be internally reflected within the glass disc 18 shown in FIG. 1E until it achieves a critical angle and is directed to the receiver 16. This can result in an interference pattern forming on the sensor 20 shown in FIG. 1F.

The remainder of the portion 72 will diffuse outward from the glass disc assembly 14 in random directions, including outwardly through the unpolished edge 64 shown in FIG. 1B.

Figure 2:
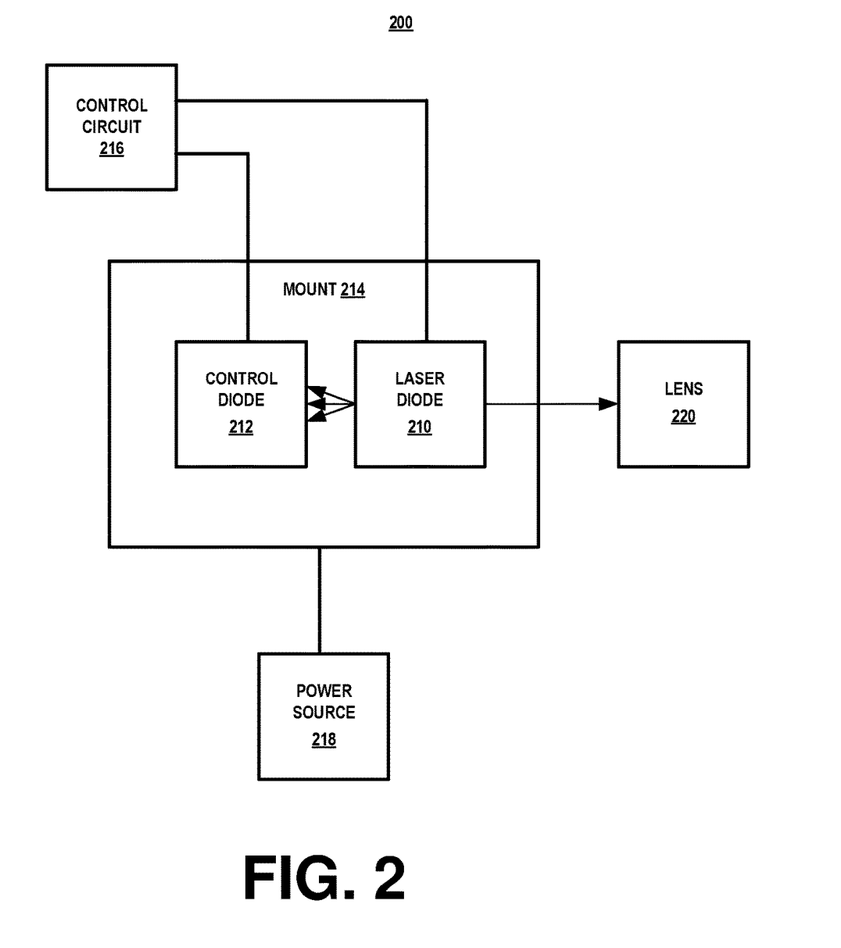
FIG. 2 illustrates a photodiode that can implement aspects of the described subject matter.

Referring now to FIG. 2 with continuing reference to the foregoing figures, there is shown a laser diode assembly, generally designated as 200, that can implement aspects of the described subject matter. The laser diode assembly 200 can be used as the light source assembly 12 shown in FIGS. 1A-1G. The laser diode assembly 200 produces feedback photons that create a Doppler effect via decibel readings.

The laser diode assembly 200 includes a laser diode 210 and a control diode 212. The laser diode 210 and the control diode 212 are mounted on a mount 214. The laser diode 210 and the control diode 212 are controlled by a control circuit 216. The laser diode 210 and the control diode 212 are powered by a power source 218 that produces a positive voltage of +9 volts.

The laser diode 210 produces photons that are transported to the control diode 212. The photons are also transported to a lens 220. The photons can return back to the laser diode 210 to build intensity via a feedback mechanism until the intensity of the photon signal is sufficient to pass through the lens 220 to the glass disc 18 shown in FIGS. 1A-1C.

Figure 3:
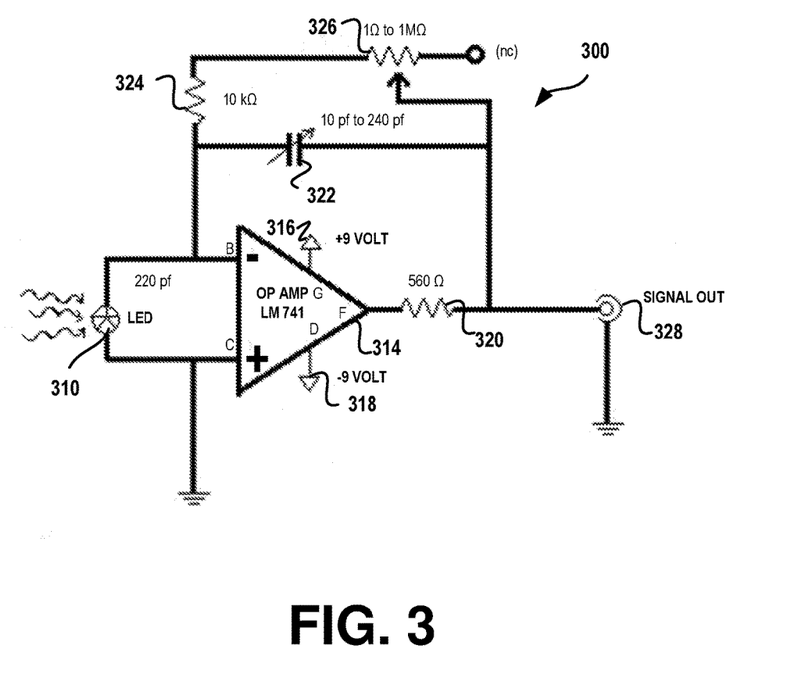
FIG. 3 illustrates a photodiode pre-amp circuit diagram that can implement aspects of the described subject matter.

Referring now to FIG. 3 with continuing reference to the foregoing figures, a photodiode pre-amp circuit, generally designated as 300, is shown. The photodiode pre-amp circuit 300 processes photons from the refracted beam 36 and the diffuse glow that emanates from the unpolished edge 66 shown in FIG. 1B. The pre-amp circuit 300 can correspond to the pre-amp circuit 54 shown in FIG. 1F.

The pre-amp circuit 300 includes a light emitting diode 310 that receives photons from the refracted beam 36 and the diffuse glow from the unpolished edge 66. The light emitting diode 310 is connected to an operational amplifier 314. The operational amplifier 314 connects to a dual power supply (not shown) at 316 and 318. The operational amplifier 314 can an LM 741 operational amplifier. The dual power supply can supply +/−9 volts.

The operational amplifier 314 is connected in series to a resistor 320 and in parallel to a variable capacitor 322 and a pair of resistors 324 and 326. The resistor 320 can have a resistance of 560 ohms. The variable capacitor 322 can have a capacitance of 10 picofarads to 240 picofarads. The resistor 324 can have a resistance of 10 kilo-ohms. The resistor 326 can have a resistance of between 1 ohm and 1 mega-ohms. The operational amplifier 314 produces a signal at 328.

Figure 4:
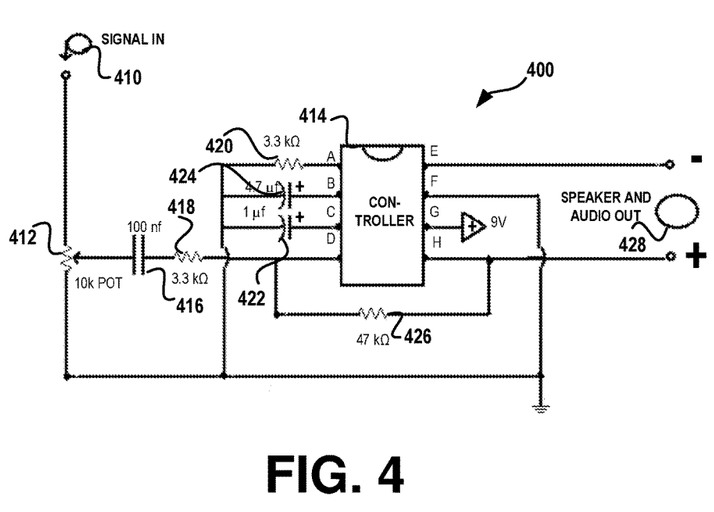
FIG. 4 illustrates an amplifier circuit diagram that can implement aspects of the described subject matter.

Referring now to FIG. 4 with continuing reference to the foregoing figures, an audio amplifier circuit, generally designated as 400, is shown. The audio amplifier circuit 400 can receive a signal from the circuit 300, shown in FIG. 3, at 328. The audio amplifier circuit 400 can include a 500 milliamp audio amplifier. The audio amplifier circuit 400 can be utilized in amplifier 56 shown in FIG. 1F.

The audio amplifier circuit 400 receives a signal at 410. The signal passes through a resistor 412 to a controller 414. The controller 414 can be a NJM21130 integrated circuit controller.

The audio amplifier circuit 400 includes a capacitor 416 and a resistor 418 connected in series to the controller 414. The capacitor 416 has a capacitance of 100 nanofarads. The resistor 418 has a resistance of 3.3 kilo-ohms.

The audio amplifier circuit 400 includes a resistor 420 and a pair of polarized capacitors 422 and 424. The resistor 420 has a resistance of 3.3 kilo-ohms. The polarized capacitors 422 and 424 have a capacitance of 1 microfarad and 4.7 microfarads, respectively.

The controller 414 is in parallel with a resistor 426 and produces an output signal at 428. The resistor 426 has a resistance of 47 kilo-ohms.

Figure 5:
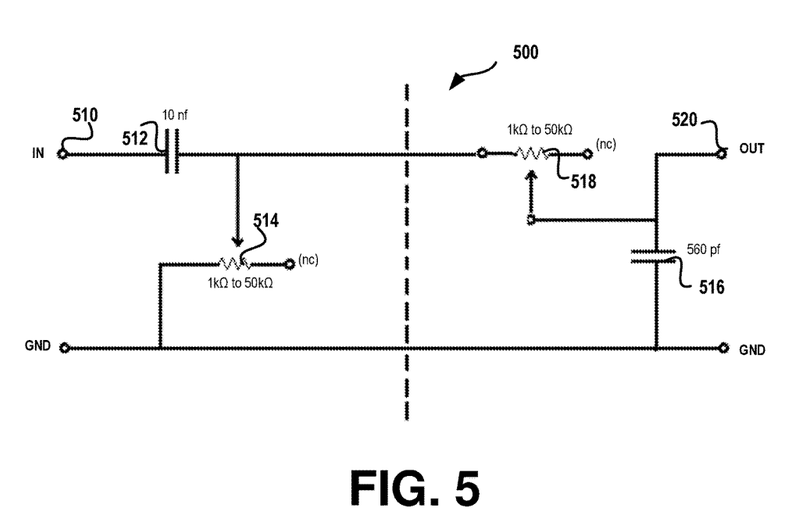
FIG. 5 illustrates a filter circuit diagram that can implement aspects of the described subject matter.

Referring now to FIG. 5 with continuing reference to the foregoing figures, a filter, generally designated as 500, is shown. The filter 500 can be positioned between the pre-amp circuit 300 and the audio amplifier 400 to condition the signal that is sent from point 328 to point 410 shown in FIGS. 3-4. The filter 500 can be a bandpass RC passive filter and can correspond to filter circuit 58 shown in FIG. 1F.

The filter 500 can receive a signal at 510. The filter 500 can include a capacitor 512 and a resistor 514 for conditioning signals within a high pass range. The capacitor 512 can have a capacitance of 10 nanofarads. The resistor 514 can have a resistance ranging from 1 ohm to 50 kilo-ohms. The high pass range can be between about 318 hertz to 13 megahertz.

The filter 500 can include a capacitor 516 and a resistor 518 for conditioning signals within a low pass range. The capacitor 516 can have a capacitance of 560 picofarads. The resistor 518 can have a resistance ranging from 1 ohm to 50 kilo-ohms. The low pass range can be between about 5.7 kilohertz to 157 megahertz. The filter 500 can produce a signal at 520.

Figure 6A:
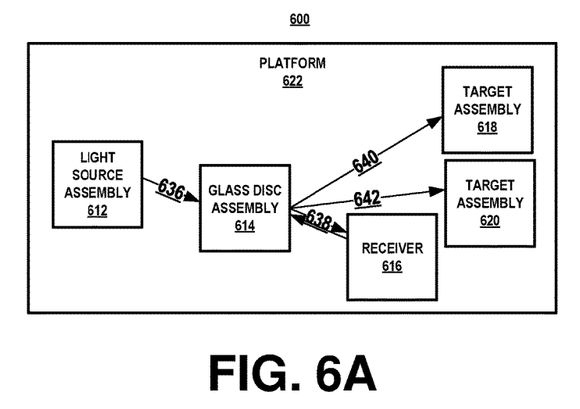
FIG. 6A illustrates a block diagram of another embodiment that can implement aspects of the described subject matter.
Figure 6B:
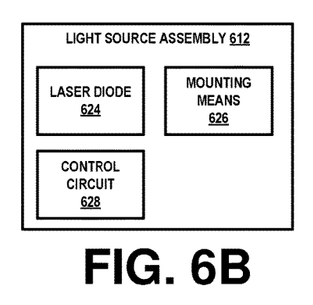
FIG. 6B illustrates a block diagram of a light source assembly that can implement aspects of the described subject matter.
Figure 6C:
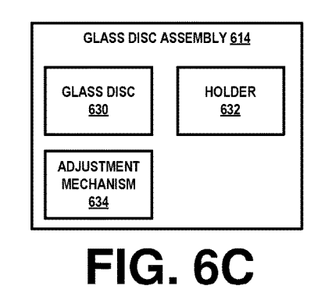
FIG. 6C illustrates a block diagram of a glass disc assembly that can implement aspects of the described subject matter.

Referring now to FIGS. 6A-6C with continuing reference to the foregoing figures, an interferometer 600 is illustrated as an embodiment that may implement aspects of the described subject matter. The interferometer 600 includes a light source assembly 612, a glass disc assembly 614, a receiver 616, and a pair of target assemblies 618-620. The light source assembly 612, the glass disc assembly 614, the receiver 616, and the pair of target assemblies 618-620 are mounted on a platform 622.

The light source assembly 612, the glass disc assembly 614, and the receiver 616 can be essentially identical to the light source assembly 12, the glass disc assembly 14, and the receiver 16 shown in FIGS. 1A-1G.

The light source assembly 612 can include a laser diode 624, mounting means 626, and control circuit 628. The laser diode 624, mounting means 626, and control circuit 628 can be essentially identical to laser diode 24, mounting means 26, and control circuit 28 shown in FIGS. 1A-1G.

The glass disc assembly 614 can include a glass disc 630, a holder 632, and an adjustment mechanism 634. The glass disc 630, the holder 632, and the adjustment mechanism 634 can be essentially identical to the glass disc 18, the holder 30, and the adjustment mechanism 32 shown in FIGS. 1A-1G.

Unlike the embodiment shown in FIGS. 1A-1G, the adjustment mechanism 634 has positioned the glass disc 630 relative to the laser diode 624 to divide a source beam 636 into refracted beam 638, reflected beam 640, and reflected beam 642. In order to divide the source beam 636 in this manner, the glass disc 630 can be aligned at angle of about 5 degrees relative to a laser diode 624.

The glass disc 630 can direct reflected beam 640 to target assembly 618. The glass disc 630 can direct reflected beam 642 to target assembly 620.

The glass disc 630 directs refracted beam 638 to receiver 616. Receiver 616 reflects the refracted beam 638 back through the glass disc 630 to combine with the reflected beams 640 and 642 to form interference patterns on target assemblies 618 and 620.

Exemplary Processes

Figure 7:
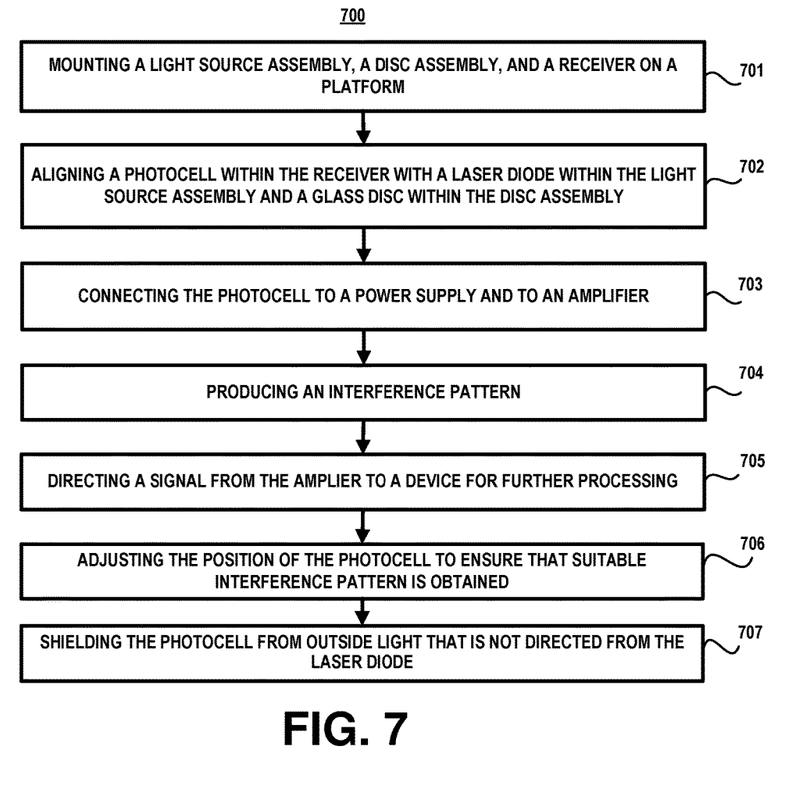
FIG. 7 illustrates an embodiment of an exemplary process in accordance with aspects of the described subject matter.

Referring to FIG. 7 with continuing reference to the foregoing figures, a method 700 for assembling an interferometer in accordance with aspects of the described subject matter is shown. The method 700, or portions thereof, can be performed to assemble the interferometer 10 shown in FIGS. 1A-1G or the interferometer 600 shown in FIGS. 6A-6C.

At 701, a light source assembly, a disc assembly, and a receiver are mounted on a platform. The light source assembly must be mounted in a manner to align the height of a laser diode with a glass disc within the disc assembly to produce a suitable interference pattern. The light source assembly 12 can include a laser diode that can be mounted on a tripod or upon a similar device that can position and/or rotate the laser diode, as necessary. In this exemplary embodiment, the light source assembly, the disc assembly, and the receiver can be the light source assembly 12, the glass disc assembly 14, and the receiver 16 shown in FIGS. 1A-1G. The glass disc can be glass disc 18. The laser diode can be laser diode 24.

At 702, a photocell within the receiver can be aligned with the laser diode and the glass disc. In this exemplary embodiment, the photocell can be essentially identical to the sensor 20 shown in FIGS. 1A-1G.

At 703, the photocell can be connected to a power source and to an amplifier. In this exemplary embodiment, the power source can be a 9 volt power source. The amplifier can be amplifier 56 shown in FIGS. 1A-1G.

At 704, an interference pattern in produced. In this exemplary embodiment, the laser diode 24 can send a source beam through the glass disc 18 to produce an interference pattern.

At 705, the amplifier can direct an audio signal to a device for further processing. In this exemplary embodiment, amplifier 56 can direct an audio signal to a device, such as an analog processor, an ADC, or a recording device.

At 706, the position of the photocell is adjusted to ensure that a suitable interference pattern is obtained. In this exemplary embodiment, the photocell can be adjusted by adjusting the position of the sensor 20 within the receiver 16, as shown in FIGS. 1A-1G.

At 707, the photocell can be shielded from outside light that is not directed from the laser. In this exemplary embodiment, the sensor 20 is shielded within the receiver 16.

Figure 8:
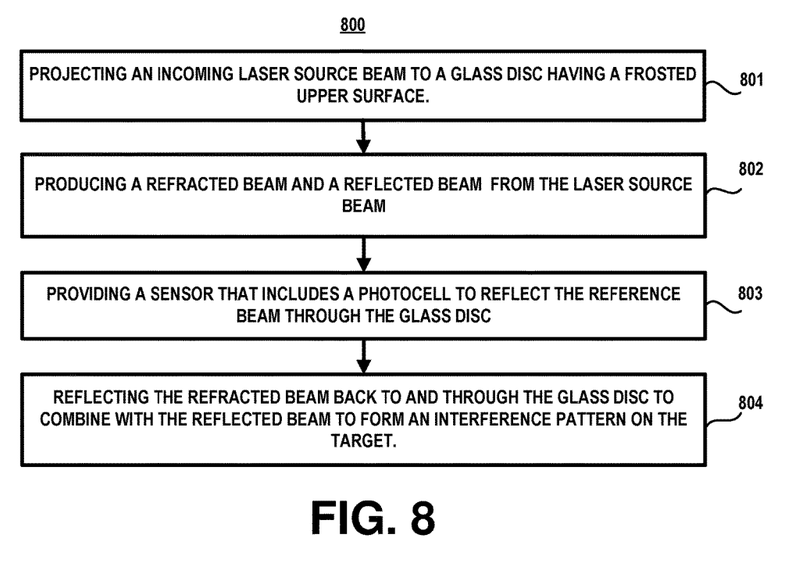
FIG. 8 illustrates an embodiment of an exemplary process in accordance with aspects of the described subject matter.

Referring to FIG. 8 with continuing reference to the foregoing figures, a method 800 for operating an interferometer in accordance with aspects of the described subject matter is shown. The method 800, or portions thereof, can be performed by the interferometer 10 shown in FIGS. 1A-1G or the interferometer 600 shown in FIGS. 6A-6C.

At, 801, an incoming laser source beam is projected to a glass disc having a frosted upper surface. In this exemplary embodiment, the laser source beam can be produced by the laser diode 24 and can be controlled by control circuit 28 shown in FIGS. 1A-1G. The glass disc can be the glass disc 18. The frosted surface can be the glass disc upper surface 60.

At 802, a refracted beam and a reflected beam are produced from the laser source beam. The reflected beam is produced by striking the glass disc upper frosted surface with the laser source beam and reflecting the reflected beam off of the glass disc upper frosted surface. The refracted beam is produced by passing a portion of the laser source beam through the glass disc. In this exemplary embodiment, the glass disc can be glass disc 18, the laser source beam can be source beam 34, the refracted beam can be refracted beam 36, and the reflected beam can be reflected beam 38 shown in FIGS. 1A-1G.

It should be understood that the glass disc upper surface can be offset at an angle of up to about 5 degrees relative to the laser diode to produce a second reflected beam in the manner shown in FIGS. 6A-6C.

At 803, a sensor that includes a photocell is provided to reflect the reference beam through the glass disc. In this exemplary embodiment, the sensor can be sensor 20 shown in FIGS. 1A-1G.

At 804, the refracted beam is reflected back to and through the glass disc to combine with the reflected beam to form an interference pattern on the target. In this exemplary embodiment, the glass disc can be glass disc 18, the refracted beam can be refracted beam 36, and the target can be the target 42 shown in FIGS. 1A-1G.

Supported Aspects

The detailed description provided above in connection with the appended drawings explicitly describes and supports various aspects of an interferometer in accordance with the described subject matter. By way of illustration and not limitation, supported aspects include an interferometer comprising: a light source, a glass disc having a frosted surface, a sensor, wherein the light source has the ability to project an incoming source beam to the glass disc, wherein the source beam interacts with the glass disc frosted surface to produce a refracted beam and a reflected beam, and wherein the sensor has the ability to reflect the refracted beam back to the glass disc to combine with the reference beam to produce an interference pattern on a target.

Supported aspects include the foregoing interferometer, wherein the sensor includes a photocell and a housing for holding the photocell.

Supported aspects include any of the foregoing interferometers, wherein the sensor includes an amplifier and the photocell connecting to the amplifier.

Supported aspects include any of the foregoing interferometers, wherein the light source is a laser.

Supported aspects include any of the foregoing interferometers, further comprising a laser diode for producing the laser.

Supported aspects include any of the foregoing interferometers, further comprising means for reflecting the refracted beam from sensor to the glass disc.

Supported aspects include any of the foregoing interferometers, wherein the glass disc includes a bottom surface opposing the frosted surface, the source beam strikes the frosted surface, the reflected beam reflects off of the frosted surface, and the refracted beam passes through the glass disc bottom surface.

Supported aspects include any of the foregoing interferometers, further comprising an adjustment mechanism for positioning the glass disc.

Supported aspects include any of the foregoing interferometers, wherein the adjustment mechanism has the ability to align the top surface offset at an angle of up to about 5 degrees relative to the incoming reference beam.

Supported aspects include any of the foregoing interferometers, wherein a second reflected beam reflects from the glass disc frosted surface.

Supported aspects include an apparatus, a system, a method and/or means for implementing any of the interferometers or portions thereof.

Supported aspects include a method for obtaining an interference pattern on a target, the method comprising: projecting an incoming laser source beam to a glass disc having a frosted upper surface, producing a refracted beam and a reflected beam from the laser source beam, and reflecting the refracted beam back to and through the glass disc to combine with the reflected beam to form an interference pattern on the target.

Supported aspects include the foregoing method, further comprising: providing a sensor that includes a photocell to reflect the reference beam through the glass disc.

Supported aspects include any of the foregoing methods, further comprising: providing a laser diode to produce the laser source beam, and controlling the laser diode.

Supported aspects include any of the foregoing methods, further comprising: aligning glass disc upper frosted surface offset at an angle of up to about 5 degrees relative to the laser diode.

Supported aspects include any of the foregoing methods, further comprising: striking the strikes the glass disc upper frosted surface with the laser source beam, reflecting the reflected beam off of the glass disc upper frosted surface, and passing refracted beam through the glass disc.

Supported aspects include any of the foregoing methods, further comprising: adjusting the position of the glass disc.

Supported aspects include any of the foregoing methods, further comprising: producing a second reflected beam.

Supported aspects include an apparatus, a system, and/or means for implementing any of the foregoing methods or portions thereof.

Supported aspects include an apparatus comprising: means for projecting an incoming laser source beam to a glass disc having a frosted upper surface, means for producing a refracted beam and a reflected beam from the laser source beam, and means for reflecting the refracted beam through the glass disc to combine with the reflected beam to form an interference pattern on the target.

Supported aspects include the foregoing apparatus, further comprising: means for controlling the laser source beam.

Supported aspects include any of the foregoing apparatus, further comprising: means for aligning the glass disc.

Supported aspects include a method, a system, and/or means for implementing any of the foregoing apparatus or portions thereof.

Supported aspects can provide various attendant and/or technical advantages in terms of improved efficiency and/or savings by not using materials to shape a target beam after reflection, which reduces or eliminates device vibration, interference and/or noise.

By way of illustration and not limitation, various features and implementations in accordance with the described subject matter produce interference patterns from a laser light source without the use of a beam splitter or a Bragg cell.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A method for obtaining an interference pattern on a target, the method comprising:
   projecting an incoming laser source beam to a glass disc having a frosted upper surface,
   producing a refracted beam and a reflected beam from the laser source beam, and
   reflecting the refracted beam back to and through the glass disc to combine with the reflected beam to form an interference pattern on the target.

2. The method of claim 1, further comprising:
   providing a sensor that includes a photocell to reflect the reference beam through the glass disc.

3. The method of claim 1, further comprising:
   providing a laser diode to produce the laser source beam, and
   controlling the laser diode.

4. The method of claim 3, further comprising:
   aligning glass disc upper frosted surface offset at an angle of up to about 5 degrees relative to the laser diode.

5. The method of claim 1, further comprising:
   striking the glass disc upper frosted surface with the laser source beam,
   reflecting the reflected beam off of the glass disc upper frosted surface, and
   passing refracted beam through the glass disc.

6. The method of claim 1, further comprising:
   adjusting the position of the glass disc.

7. The method of claim 1, further comprising:
producing a second reflected beam.

* * * * *